Patented Nov. 1, 1938

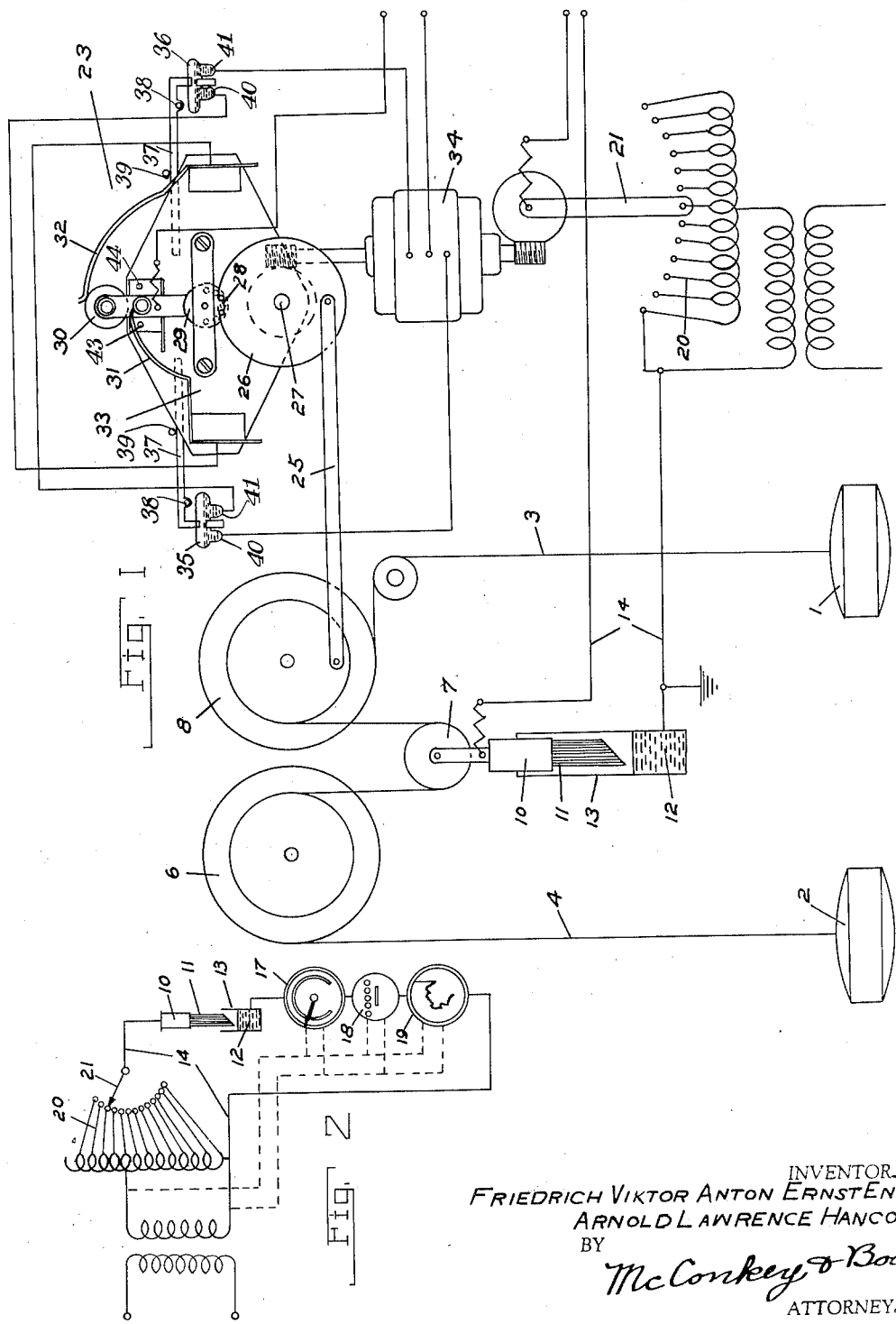

2,134,864

UNITED STATES PATENT OFFICE 2,134,864

FLOWMETER

Friedrich Viktor Anton Ernst Engel and Arnold Lawrence Hancock, London, England, assignors to Republic Flow Meters Company, Chicago, Ill., a corporation of Illinois Application November 7, 1935, Serial No. 48,668
In Great Britain November 24, 1934

4 Claims. (Cl. 73—215)

This invention relates to flowmeters and more particularly to instruments of this character for measuring flow of liquid in open channels or in conduits not running full.

The flow of liquid in open conduits or unfilled pipes is extremely difficult to measure directly but can be ascertained from functions of other variable quantities which can be measured more easily. One method of ascertaining the rate of flow is by employing a Venturi flume or weir and measuring the differential head at the throat of the flume or weir and at a point at the upstream side thereof and further measuring the head at one of these points. From these measurements the flow may be calculated according to the formula:

$$Q = kwh_2\sqrt{h_1 - h_2}$$

where $Q$ = the rate of flow,
$w$ = the width of the throat of the flume or weir,
$h_1$ = the level of liquid upstream of the flume or the height of liquid above the crest of the weir upstream thereof,
$h_2$ = the level of liquid in the throat of the flume or the height of liquid above the crest of the weir, and
$k$ = constant.

These measurements may conveniently be made by employing floats or other members displaceable according to the liquid level at the points to be measured.

Owing to the fact that the displacement of one of the aforesaid members is often many times that of the other, difficulties or inaccuracies are frequently experienced or introduced in combining or compounding functions of the nature above referred to since a small error in one function may be greatly increased when multiplied by or compounded with the other function, and one of the objects of the present invention is to provide an improved form of device or instrument having members displaceable with variations in two functions of the rate of flow and possessing a high degree of accuracy under all conditions of working.

According to one embodiment of the invention, the improved device or instrument comprises two members displaceable with variations in functions which vary with the rate of flow and which can be combined to give a resultant affording a measure of the rate of flow, the said members being coupled to variable or displaceable elements arranged in an electrical measuring circuit in such a manner that an electrical characteristic of the circuit is varied proportionally to the rate of flow, and a relay device included in the coupling between one of the said members and its associated element.

According to a further feature of the invention, the improved device or instrument comprises two members, one of which is displaceable according to the differential head between a point at the upstream side of a Venturi flume or weir stream and a point at the throat of the flume or the crest of the weir, and the other is displaceable according to the head at one of these points, means coupling said members to variable or displaceable elements arranged in an electrical measuring circuit so that an electrical characteristic of the circuit varies with the rate of flow, and a relay device included in the coupling between one of the members and its associated element.

The aforesaid variable or displaceable elements are preferably arranged in series in the electrical measuring circuit, the arrangement being such that the value of the electric current traversing the said circuit is varied by the variable or displaceable elements to afford a measure of the rate of flow of the liquid.

In order that the said invention may be clearly understood and readily carried into effect, the same will now be more fully described with reference to the accompanying drawing in which:

Figure 1 illustrates diagrammatically one mode of carrying the invention into effect, and Figure 2 shows a circuit diagram of the device of Figure 1.

Referring now to Figure 1 of the drawing, 1 indicates a float member located in a chamber communicating with the throat of a Venturi flume and 2 indicates another float member located in a chamber in communication with the upstream side of the flume. To the floats 1 and 2 are attached cords 3 and 4 respectively, one of which passes to one side of a differential gear made up of three pulley wheels indicated at 6, 7, and 8 and the other of which passes to the other side of said differential gear. The pulley wheels 6 and 8 are rotatable about fixed axes and the pulley wheel 7 is suspended from the other two pulleys so that it is free to move vertically in such a manner that its movements are proportional to the difference between the level of the liquid at the throat and that at the upstream of the flume.

Suspended from the axis of the movable pulley 7 is a resistance device 10, comprising a plurality of contact rods 11 of different lengths connected at their upper ends to resistances or resistance sections (not shown) which are preferably wound on one or more spools accommodated in the upper part of the device. The contact rods 11 are arranged so that they are adapted to dip into a body of mercury or other electrically conducting liquid 12 contained in the lower part of a casing 13. The casing and the upper end of the resistance device are connected in an electrical circuit 14 so that, as the resistance device descends, the number of contact rods dipping into the mercury will be increased and more and more of the resistance sections will be short circuited. Hence the effective resistance of the resistance device will be varied as the pulley 7 rises and falls with variations in the value of the differential head.

In instances in which it is desired to make use of the formula above referred to, the lower ends of the contact rods are preferably arranged so that the effective resistance of the resistance device is proportional to the reciprocal of the square root of the said differential head.

The electrical circuit 14 also includes a voltage regulating device here shown as an auto-transformer 20 having a tapping switch or pivotally mounted contact arm 21 movable proportionally to the head at one of the above-mentioned points, e. g. that at the throat of the flume, and so that the voltage applied to the resistance device is varied proportionally to the head at the point referred to and the value of the current flowing in the measuring circuit can be utilized as a measure of the rate of flow of the liquid passing through the flume or over the weir. As shown in Figure 2, the measuring circuit may include one or more reading instruments such as an indicator 17, an integrator 18 and a recorder 19.

It will be appreciated that, while the contact arm 21 may be coupled directly to the pulley 8, this is often undesirable for the reason that frictional errors are likely to arise and such errors are increased or multiplied when the function of the head at the throat is compounded with another function such as the differential head above referred to or its square root. In the instrument provided in accordance with the present invention, therefore, a relay device 23 is employed and, in the arrangement shown, is interposed between the pulley 8 and the contact arm 21. This relay device may be of any suitable form and as shown is substantially similar to that fully disclosed in British Patent No. 430,089. In this construction the pulley 8 is connected by a link 25 to a disc 26 rotatable on an axis 27. The disc 26 has a notch 28 in its periphery and carries pins engageable with pins on a rotatable disc 29 so that rotation of the disc 26 will rotate the disc 29.

The disc 29 carries an arm 30 formed of suitable insulating material and which has a contact roller 30 mounted on its free end for engagement with spring contacts 31 and 32, the roller 30 normally lying out of engagement with either spring contact. The spring contacts 31 and 32 are carried by a carriage 33 on which the disc 29 is pivoted and which is itself pivoted on the axis 27 and whose position is controlled by a reversible electric motor 34 which is also geared to the contact arm 21 and is connected in circuit with the roller 30 and contacts 31 and 32.

As the pulley wheel 8 turns it turns the disc 26 which rotates the disc 29 and swings the roller 30 into engagement with one of the contacts 31 or 32. This completes a circuit through the motor 34 causing it to turn the carriage 33 in the same direction as the disc 29 until the contact 31 or 32 which engaged the roller 30 is moved out of engagement therewith and the motor circuit is interrupted. At the same time the contact arm 21 will be moved into a new position by the motor 34, its degree of movement corresponding directly to the amount of movement of the pulley wheel 8.

In order to limit movement of the carriage 33 there is provided a low limit mercury switch 35 included in one of the field circuits of the motor 34 and a high limit mercury switch 36 included in the other field circuit of the motor. The switches are carried by brackets or arms 37 pivoted at 38 and are arranged so that they normally occupy the horizontal positions shown with the free portions of the arms bearing against stop pins 39 and with the mercury bridging the contacts 40 and 41 provided at the lower portion of each switch. The angularly adjustable carriage 33 is provided with a pair of pins 43 and 44 arranged in such positions that, when the carriage is displaced a predetermined amount in a counter-clockwise direction, the pin 43 is adapted to engage the free end of the arm 37 carrying the low limit switch 35 and, when the carriage is displaced by a predetermined amount in a clockwise direction the pin 44 is adapted to engage the free end of the arm 37 carrying the high limit switch 36. In this manner either switch can be tripped to cause the operation of the motor and the movement of the displaceable carriage to be temporarily stopped until such time as the movement of the pulley wheel 8 and disc 26 again come within the range for which the limit switches are set.

While only one embodiment of the invention has been shown and described it will be apparent that the same is susceptible of many changes and it is not intended to be limited to the form shown or otherwise than by the terms of the appended claims.

What is claimed is:

1. A flowmeter for measuring flow through a conduit having an obstruction therein comprising a member movable proportionally to the level at the throat of the obstruction, a member movable proportionally to the level at a point upstream of the obstruction, an electrical measuring circuit, a variable resistance in said circuit, means connecting said resistance to both of said members to be varried according to the differential of movement thereof, a voltage regulator in said circuit, and a power relay connecting one of said members to said voltage regulator to vary the voltage in said circuit.

2. A flowmeter for measuring flow in an open channel having an obstruction therein comprising, a float member movable proportionally to the head at the throat of the obstruction, and a second float member movable proportionally to the head upstream of the obstruction, an electrical measuring circuit, a plurality of control devices in said circuit, a connection from both of said members to one of said devices to move it according to the differential of movement of said members and power relay means connecting one of said members to the other of said devices.

3. A flowmeter for measuring flow in an open channel having an obstruction therein comprising, a float member movable proportionally to the head at the throat of the obstruction, and a second float member movable proportionally to the head upstream of the obstruction, an electrical measuring circuit, a variable resistance device in said circuit, a connection from both of said members to said device to adjust it according to the differential of movement of said members, a voltage regulator in said circuit, and power relay means connecting the first named of said members to said voltage regulator.

4. A flowmeter for measuring flow in an open channel having an obstruction therein comprising, a float member movable proportionally to the head at the throat of the obstruction, and a second float member movable proportionally to the head upstream of the obstruction, an electrical measuring circuit, a variable resistance device in said circuit connected to both of said members to be varied according to the differential of their movement and operable to vary the resistance in said circuit proportionally to the reciprocal of the square root of the differential head, a voltage regulator in said circuit, and a connection from one of said members to the voltage regulator, said last named connection including a power relay device.

FRIEDRICH VIKTOR ANTON
     ERNST ENGEL.
ARNOLD LAWRENCE HANCOCK.